United States Patent [19] [11] 4,288,250
Yamashita [45] Sep. 8, 1981

[54] GLASS FILTER FOR CONTRAST ENHANCEMENT IN CRT DISPLAYS
[75] Inventor: Toshiharu Yamashita, Hachioji, Japan
[73] Assignee: Hoya Corporation, Tokyo, Japan
[21] Appl. No.: 132,347
[22] Filed: Mar. 20, 1980
[30] Foreign Application Priority Data
Mar. 20, 1979 [JP] Japan .................. 54-31785
[51] Int. Cl.³ .......... C03C 3/04; C07C 3/08; C03C 3/10
[52] U.S. Cl. .................. 501/78; 501/79
[58] Field of Search .......... 106/52, 53, 54; 252/301.4 F, 300

[56] References Cited
U.S. PATENT DOCUMENTS
2,552,125 5/1951 Tillyer .................. 106/52
3,364,041 1/1968 Swain, Jr. et al. .......... 106/52
3,915,722 10/1975 Schaller .................. 106/52
3,947,281 3/1976 Bacon .................. 106/52

Primary Examiner—O. R. Vertiz
Assistant Examiner—Mark Bell
Attorney, Agent, or Firm—Sughrue, Mion, Zinn, Macpeak and Seas

[57] ABSTRACT

A green contrast enhancement filter for CRT display devices which is prepared by adding about 0.1 to 1.5 part by weight of $Cr_2O_3$, about 0 to 0.5 part by weight of CuO and about 0 to 0.2 part by weight of NiO to 100 parts by weight of a base glass comprising about 4 to 70% by weight of $SiO_2$, about 15 to 30% by weight of $Nd_2O_3$, about 0 to 25% by weight of one or more alkali metal oxides ($R_2O$) and about 0 to 46% by weight of one or more divalent metal oxides (RO) such as MgO, CaO, SrO, BaO, ZnO and PbO, wherein the sum $R_2O+RO$ is about 10 to 50% by weight, about 0 to 25% by weight $B_2O_3$, about 10% by weight or less $Al_2O_3$ and about 0 to 10% by weight each of $TiO_2$, $ZrO_2$, $La_2O_3$, $Nb_2O_5$ and $Ta_2O_5$.

6 Claims, 2 Drawing Figures

GLASS FILTER FOR CONTRAST ENHANCEMENT IN CRT DISPLAYS

BACKGROUND OF THE INVENTION

1. Field of Invention

The present invention relates to a green contrast enhancement filter for CRT display devices in which small amounts of elements are present for coloring and controlling the transmission of an $Nd_2O_3$ containing silicate glass. Particularly, it relates to a green glass filter having a sharp transmission peak in the wavelength range of 540 to 550 m$\mu$ having a peak transmittance of about 10 to 16% through which light of wavelengths outside the transmission peak does not or substantially does not pass, and to a green filter glass through which light having a wavelength of 610 to 620 m$\mu$ passes with a transmittance of about 2 to 4% together with the light of said transmission peak.

2. Description of the Prior Art

In Braun tubes for figure display screens, etc., phosphor P-43 is often used as a fluorescent film on the inner face of the display. This phosphor has luminous peaks near 430 m$\mu$ (blue), 545 m$\mu$ (green) and 615 m$\mu$ (red), and these three color luminescences are joined to obtain white light, by which display is accomplished in black and white. The black-white display, however, has the fault that the figures often flicker and are obscure. In order to overcome this defect, though attempts have been made to improve the cathode ray tube (CRT) itself or to provide a gray plate on the front face of the display panel. These attempts are not fully developed as yet.

It has been found that it is most effective to lay a green glass filter having a sharp transmission peak on the front face of the display screen in order to overcome the above described faults. It is most preferred from the viewpoint of facilitating reading to display with red light of about 615 m$\mu$ and lay a glass plate which absorbs light of 600 m$\mu$ or less over the screen when the reading is carried out in the dark. It has also been found that a CRT display device having standard luminance shows the most excellent contrast and provides a clear-image without flickering when the peak transmittance of the filter is about 10 to 16% for green light and 2 to 4% for red light.

SUMMARY OF THE INVENTION

An object of the present invention is to provide a green filter having a sharp transmission peak in only the wavelength range of 540 to 550 m$\mu$ where the peak transmittance is to 10 to 16% and a green filter glass through which 2 to 4% light having a wavelength of 610 to 620 m$\mu$ passes together with the light in the 540 to 550 m$\mu$ transmission peak.

The above object of the present invention has been attained by incorporating comparatively large amounts of $Nd_2O_3$ and $Cr_2O_3$ in the filter glass composition. In accordance with the present invention about 0.1 to 1.5 part by weight $Cr_2O_3$, about 0 to 0.5 part by weight of CuO and about 0 to 0.2 part by weight of NiO are added to 100 parts by weight of a base glass comprising about 4 to 70% by weight of $SiO_2$, about 15 to 30% by weight of $Nd_2O_3$, about 0 to 25% by weight of one or more alkali metal oxides ($R_2O$) such as $K_2O$, $Na_2O$ and $Li_2O$ and about 0 to 46% by weight of one or more divalent metal oxides (RO) such as MgO, CaO, SrO, BaO, ZnO and PbO such that the sum $R_2O+RO$ is about 10 to 50% by weight, about 0 to 25% by weight $B_2O_3$, about 0 to 10% by weight $Al_2O_3$, and about up to 10% by weight of any of $TiO_2$, $ZrO_2$, $La_2O_3$, $Nb_2O_5$ and $Ta_2O_5$ (The total amount of $TiO_2$ and the like should not be more than about 20 wt.%.)

DESCRIPTION OF THE INVENTION

Figure 2:
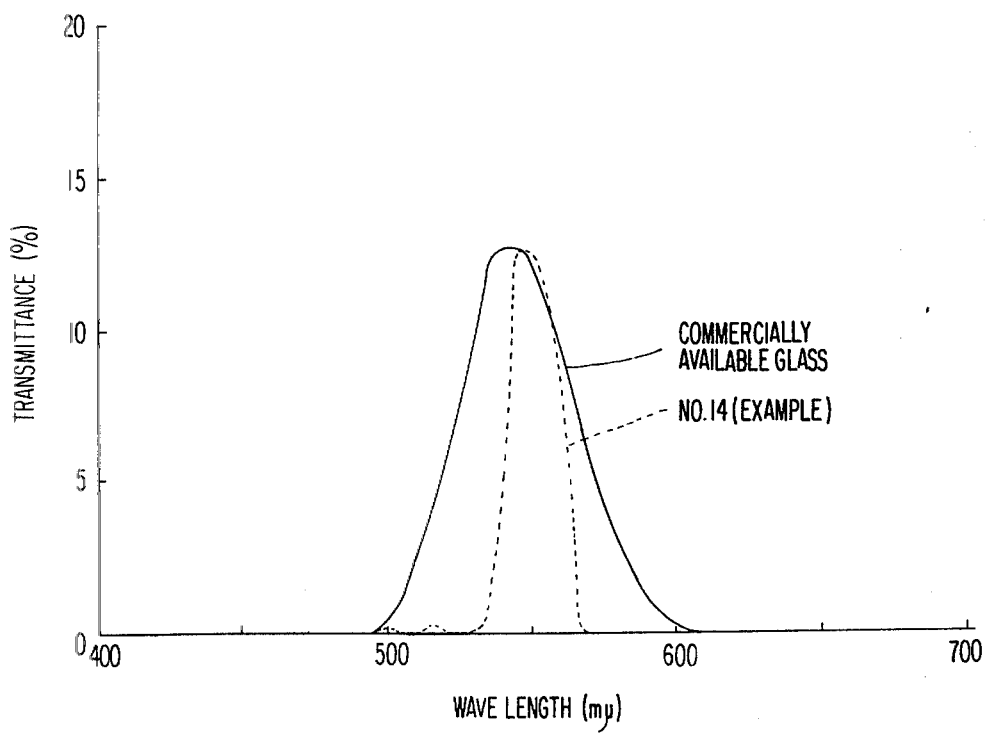
FIG. 2 compares the spectral transmission curve of the glass of Example 14 of the present invention with that of an available glass.

In general optical glasses, it has been well-known that the green glasses are obtained by the addition of $Cr_2O_3$ or $Cr_2O_3$ and CuO, and a glass having a transmission peak of 540 to 550 m$\mu$ is obtained by controlling the amount thereof. Though such glass has been commercially available, its transmission peak is very broad. FIG. 2 is provided to clearly illustrate this point wherein the solid line is a percent transmission curve of a commercially available glass ("G-545", a product of Hoya Corp.) having a 2.5 mm thickness and the dotted line is that of the product of Example 14 (thickness: 5.0 mm) from the following examples. The transmission peak of the product of the present invention is sharp while the half-width of the transmission peak of the available glass is about 50 m$\mu$ and the skirts thereof reach 500 m$\mu$ and 600 m$\mu$ respectively.

The glass filter according to the present invention derives its characteristic sharp transmission peak from the introduction of a comparatively large amount of $Nd_2O_3$. $Cr_2O_3$ stably dissolves in the glass even though the glass contains the large amount of $Nd_2O_3$. The coloration by the Cr ions can be adjusted so as to provide a suitable composition and transmission properties.

The significance of the $Nd_2O_3$ content of the glass is described below.

$Nd_2O_3$ containing silicate glass is practically used for glasses, wavelength correction filters for a spectrophotometer, laser glass, etc. But the $Nd_2O_3$ content is at most 7 to 8% and Cr is not present. Further, the dissolution of Cr and the sharp transmission peak enjoyed in the present invention have not been known. Weyl describes $Nd_2O_3$ containing glasses in *Coloured Glasses*, Society of Glass Technology, Dawsons of Pall Mall, London, 1959, pp. 78, 79, 222-229, but the $Nd_2O_3$ content is at most 13.6% by weight and the possibility of amounts larger than 13.6% is not disclosed. Nor does Weyl suggest the copresence of $Nd_2O_3$ and $Cr_2O_3$ or the dissolution of $Cr_2O_3$ and the sharp transmission peak of the glass of the present invention.

According to the present invention, a filter having a composition which possesses specific spectral transmission characteristics in a specified wavelength range can be obtained by incorporating comparatively large amounts of $Nd_2O_3$ and $Cr_2O_3$ as described above.

Figure 1:
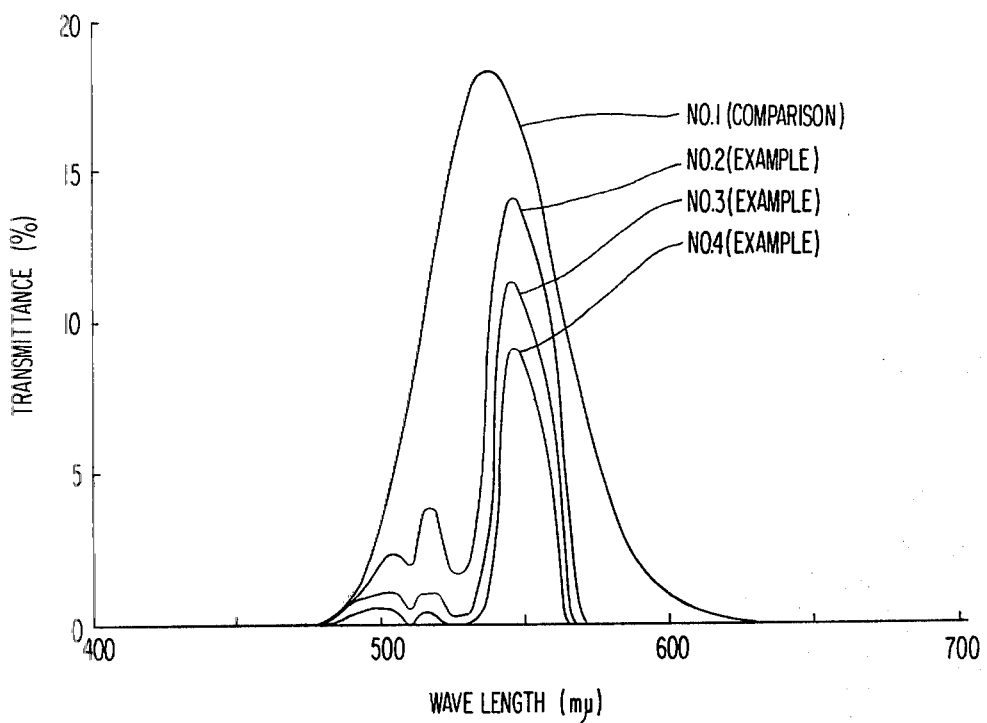
FIG. 1 presents the transmission curves for the glasses in Examples 1-4 of the present invention.

When variation of the transmission peak is measured using a colored glass having the following composition to which $Nd_2O_3$ was not added (No. 1) or added in the amount of 10, 20 or 30 parts by weight based on 100 parts by weight of the base glass (No. 2-4), spectral transmission characteristic curves as shown in FIG. 1 are obtained. The amounts of $SiO_2$, $Al_2O_3$, $Na_2O$, $K_2O$, MgO, CaO and $As_2O_3$ are in weight percents, and the amounts of $Cr_2O_3$, CuO and $Nd_2O_3$ are in parts by weight per 100 parts by weight of the base glass.

| Composition No. | 1 | 2 | 3 | 4 |
|---|---|---|---|---|
| $SiO_2$ | 71.0 | 71.0 | 71.0 | 71.0 |
| $Al_2O_3$ | 2.0 | 2.0 | 2.0 | 2.0 |
| $Na_2O$ | 14.5 | 14.5 | 14.5 | 14.5 |
| $K_2O$ | 1.7 | 1.7 | 1.7 | 1.7 |
| MgO | 2.5 | 2.5 | 2.5 | 2.5 |
| CaO | 7.3 | 7.3 | 7.3 | 7.3 |
| $As_2O_3$ | 1.0 | 1.0 | 1.0 | 1.0 |
| $Cr_2O_3$ | 0.83 | 0.83 | 0.83 | 0.83 |
| CuO | 0.43 | 0.43 | 0.43 | 0.43 |
| $Nd_2O_3$ | 0 | 10 | 20 | 30 |

It is believed in FIG. 1 that the broader transmissions on both sides of the peak wavelengths in the broad transmission peak formed by the Cr ion and Cu ion are absorbed by the Nd ion as the $Nd_2O_3$ content increases, whereby, the transmission peak becomes sharp and transmission of light having wavelengths other than the peak wavelengths decreases.

Among silicate, borate and phosphate glasses, it is possible to introduce $Nd_2O_3$ in the largest amount into the borates and the resulting mixture is stable. This is apparent from the fact that a $B_2O_3$ glass containing about 30% by weight of $Nd_2O_3$ is available on the market as a filter glass. However, if $Nd_2O_3$ is added to a borate glass having a high $B_2O_3$ content, transmission of wavelengths shorter than 500 m$\mu$ becomes large because the absorption by Cr ion in the short visible wavelength range is weak. Further, in a phosphate glass, though the solubility of Cr is the largest, light having a wavelength of about 400 to 420 m$\mu$ passes therethrough and the glass becomes unstable when $Nd_2O_3$ is introduced thereto, and as a result a large amount of $Nd_2O_3$ can not be added.

The green filter glass of the present invention is prepared by adding very small amounts of $Cr_2O_3$, CuO and NiO to 100 parts by weight of the above described silicate glass containing a large amount of $Nd_2O_3$. The reasons for limiting the amounts of each of these components are as follows. If $SiO_2$ in the base glass is more than 70%, it becomes difficult to vitrify because the viscosity of the glass is too high. If it is less than 4%, vitrification occurs only if a comparatively large amount of $B_2O_3$ is present, in which case chemical durability under use is not obtained and light transmission in the wavelength range shorter than the transmission peak becomes large.

The larger the $R_2O$ and RO contents are, the more easily $Cr_2O_3$ and $Nd_2O_3$ dissolve. Further, these components improve the fusing property and mechanical properties of the glass. However, if $R_2O$ is more than 25%, the chemical durability of the glass deteriorates, and if RO is more than 46%, not only the chemical durability of the glass deteriorates but also devitrification easily occurs. Further, if the total amount of $R_2O$ and RO is less than 10%, $Cr_2O_3$ and $Nd_2O_3$ are difficult to dissolve in the glass and the viscosity of the glass is too high. Preferably the total amount of $R_2O$ and RO is about 15 to 40% by weight. If it is more than 50%, the chemical durability of the glass deteriorates and the glass is easily devitrified. $Na_2O$ and $K_2O$ are preferred as $R_2O$ oxides. RO oxides and especially RO oxides having a large ionic radius such as PbO and BaO are preferred in the glass composition from the viewpoint of increasing solubility of $Cr_2O_3$ and improving the chemical durability and mechanical properties of the glass.

As explained in FIG. 1, a sharp transmission peak is obtained by introducing $Nd_2O_3$. The sharpness is lacking if the amount is less than 15%, and transmission of light of about 520 m$\mu$ increases. When it is more than 30%, the peak transmittance of 540 to 550 m$\mu$ is less than 10%, because the absorption by $Nd^{3+}$ ion is too intensive. $B_2O_3$ may be added to shift the transmission peak to a shorter wavelength and improve the fusing property of the glass. Amounts of more than 25% are not preferred because transmission of the light having shorter wavelengths than the transmission peak becomes too large. $Al_2O_3$ may be added to improve the chemical durability of the glass, but it is difficult to dissolve $Cr_2O_3$ if the amount of $Al_2O_3$ is more than 10%. $TiO_2$, $ZrO_2$, $La_2O_3$, $Nb_2O_5$ or $Ta_2O_5$ may be added to improve the chemical durability of the glass, but the glass is easily devitrified if they are present in an amount more than 10%.

$Cr_2O_3$ is the component absorbing light having wavelengths other than (above and below) 540 to 550 m$\mu$ in the transmission peak. If it is present in an amount less than 0.1 part by weight, transmission of the light on the shorter wavelength side in the transmission peak becomes too large. If it is more than 1.5 parts by weight, the peak transmittance becomes 10% or less.

CuO is effective as a supplemental component for $Cr_2O_3$ because it reduces the transmission of light on the longer wavelength side of the transmission peak and shifts the transmission peak to shorter wavelengths. However, if it is incorporated in an amount of more than 0.5 part by weight, the peak transmittance becomes less than 10% and glass through which 2 to 4% of light of 610 to 620 m$\mu$ in wavelength passes can not be obtained.

NiO reduces the transmission of light on the shorter wavelength side of the transmission peak and shifts the peak wavelength to longer wavelengths in contrast to CuO. If it is present in an amount more than 0.2 part by weight, the peak wavelength exceeds 550 m$\mu$ and the peak transmittance becomes less than 10%.

Further, it is possible to produce a glass through which 2 to 4% of light 610 to 620 m$\mu$ in wavelength passes and glass through which such light does not pass using the same base glass composition by controlling the amounts of $Cr_2O_3$, CuO and NiO as described in the following examples (No. 14, 22, 27 and 28). When the desired absorption characteristics are not obtained by the addition of $Cr_2O_3$ alone, CuO and/or NiO can be added to the composition to shift the transmission peak wavelength and adjust the transmittance. The absorption characteristics of $Cr_2O_3$ vary slightly depending on the base glass composition, thus, in this sense CuO and NiO are used to fine tune the filter's optical characteristics. In the examples, $As_2O_3$ and $Sb_2O_3$ are added as refining agents in a conventional manner.

In the following, examples of the present invention (No. 5-32) are shown (each component is shown as % by weight). The amounts of $Cr_2O_3$, CuO and NiO in the table are in parts per 100 parts base glass.

| Component | Example No. |
|---|---|

-continued

| No. | 5 | 6 | 7 | 8 | 9 | 10 | 11 | 12 | 13 | 14 | 15 | 16 | 17 | 18 |
|---|---|---|---|---|---|---|---|---|---|---|---|---|---|---|
| $SiO_2$ | 70.0 | 65.0 | 63.0 | 56.0 | 58.9 | 59.8 | 58.6 | 47.3 | 53.4 | 50.4 | 48.0 | 35.0 | 40.0 | 35.0 |
| $Nd_2O_3$ | 20.0 | 20.0 | 25.0 | 20.0 | 23.9 | 16.6 | 20.3 | 16.6 | 19.9 | 23.5 | 27.2 | 20.0 | 20.0 | 20.0 |
| $Li_2O$ | | | | | | 2.0 | | | | | | | | |
| $Na_2O$ | 10.0 | 10.0 | 12.0 | 12.4 | 9.6 | 12.1 | 9.9 | 10.8 | 10.4 | 16.2 | 15.4 | 2.3 | 3.5 | 12.3 |
| $K_2O$ | | | | 10.0 | 1.6 | 1.7 | 5.6 | 0.3 | 0.3 | | | 5.4 | 4.0 | 5.4 |
| MgO | | | | | | 2.1 | | | | | | | | |
| CaO | | | | 2.4 | 5.8 | 4.0 | | | | | | | | |
| SrO | | | | | | | | | | | | 16.0 | | |
| BaO | | | | | 0.2 | | | | | 6.1 | 5.8 | 37.3 | | |
| ZnO | | | | | | | | 4.2 | 4.0 | | | | 9.0 | |
| PbO | | | | | | | | 20.8 | 12.0 | | | | 2.5 | 27.3 |
| $B_2O_3$ | | 5.0 | | | | | | | | 3.8 | 3.6 | | 5.0 | |
| $Al_2O_3$ | | | | 1.6 | 1.6 | 1.7 | 1.6 | | | | | | | |
| $TiO_2$ | | | | | | | | | | | | | | |
| $ZrO_2$ | | | | | | | | | | | | | | |
| $La_2O_3$ | | | | | | | | | | | | | | |
| $Nb_2O_5$ | | | | | | | | | | | | | | |
| $Ta_2O_5$ | | | | | | | | | | | | | | |
| $As_2O_3$ | 0.2 | 0.2 | 0.2 | 0.8 | 0.8 | 0.8 | | 0.8 | 0.8 | 0.2 | 0.2 | 0.2 | 0.2 | 0.2 |
| $Sb_2O_3$ | | | | | | | 0.2 | | | | | | | |
| $Cr_2O_3$ | 0.52 | 0.52 | 0.52 | 0.80 | 0.62 | 0.69 | 0.66 | 0.60 | 0.49 | 0.94 | 0.90 | 0.35 | 0.40 | 0.55 |
| CuO | 0.25 | 0.25 | 0.25 | 0.40 | 0.34 | 0.36 | 0.35 | 0.31 | 0.26 | 0.09 | 0.09 | 0.20 | 0.22 | 0.32 |
| NiO | | | | | | | | | | | | | | |
| Transmission peak wavelength (mμ) | 548 | 546 | 549 | 546 | 547 | 546 | 546 | 546 | 547 | 547 | 547 | 547 | 546 | 549 |
| Peak transmittance (%) | 15.6 | 13.6 | 12.1 | 14.0 | 10.5 | 11.2 | 11.6 | 10.0 | 13.2 | 12.6 | 10.2 | 10.0 | 10.2 | 10.5 |
| Maximum transmittance between 610–620 mμ (%) | | | | | | | | | | | | | | |

| Component No. | 19 | 20 | 21 | 22 | 23 | 24 | 25 | 26 | 27 | 28 | 29 | 30 | 31 | 32 |
|---|---|---|---|---|---|---|---|---|---|---|---|---|---|---|
| $SiO_2$ | 35.0 | 46.7 | 48.3 | 50.4 | 18.7 | 14.8 | 22.5 | 22.5 | 5.0 | 50.4 | 50.4 | 54.2 | 50.8 | 58.6 |
| $Nd_2O_3$ | 20.0 | 20.0 | 17.5 | 23.5 | 22.0 | 21.0 | 21.8 | 16.8 | 15.0 | 23.5 | 23.5 | 20.0 | 20.1 | 20.3 |
| $Li_2O$ | | | | | | | | | | | | | | |
| $Na_2O$ | 2.3 | 17.6 | 17.9 | 16.2 | | | | | | 16.2 | 16.2 | 7.0 | 10.4 | 13.9 |
| $K_2O$ | 5.4 | | | | | | | | | | | 8.4 | 0.3 | 1.7 |
| MgO | | | 5.8 | | | | | | | | | | | |
| CaO | | 7.5 | | | | 7.5 | | | | | | | | 4.0 |
| SrO | | | | | | 10.0 | | | | | | | | |
| BaO | | | | 6.1 | 44.4 | 22.5 | 35.0 | 35.0 | 15.0 | 6.1 | 6.1 | 1.2 | | |
| ZnO | | | | | | | 4.0 | 4.0 | 28.0 | | | | 4.0 | |
| PbO | 27.3 | | | | | | | | | | | | 12.0 | |
| $B_2O_3$ | 10.0 | 2.5 | 2.7 | 3.8 | 14.3 | 23.2 | 5.7 | 5.7 | 19.5 | 3.8 | 3.8 | 9.1 | 2.4 | |
| $Al_2O_3$ | | 5.7 | 7.8 | | | | | | | | | | | 1.6 |
| $TiO_2$ | | | | | 0.4 | | | | 5.8 | | | | | |
| $ZrO_2$ | | | | | 0.2 | 1.0 | 6.0 | 6.0 | 3.0 | | | | | |
| $La_2O_3$ | | | | | | | | 5.0 | 8.7 | | | | | |
| $Nb_2O_5$ | | | | | | | 5.0 | | | | | | | |
| $Ta_2O_5$ | | | | | | | | | 5.0 | | | | | |
| $As_2O_3$ | 0.2 | | 0.2 | 0.2 | 0.3 | 0.3 | | 0.2 | — | 0.2 | 0.2 | 0.2 | 0.2 | 0.2 |
| $Sb_2O_3$ | | 0.2 | | | | | 0.2 | — | | | | | | |
| $Cr_2O_3$ | 0.30 | 0.80 | 0.70 | 0.94 | 0.35 | 0.26 | 0.25 | 0.22 | 0.25 | 0.67 | 0.76 | 0.66 | 0.58 | 0.83 |
| CuO | 0.17 | 0.10 | 0.05 | — | 0.10 | 0.03 | — | 0.08 | 0.05 | 0.05 | — | — | 0.08 | 0.08 |
| NiO | | | | | | | | | | 0.08 | 0.06 | | 0.02 | |
| Transmission peak wavelength (mμ) | 544 | 549 | 550 | 548 | 546 | 546 | 550 | 548 | 549 | 550 | 550 | 549 | 550 | 549 |
| Peak transmittance (%) | 10.0 | 11.0 | 12.3 | 15.9 | 11.5 | 13.0 | 15.0 | 14.0 | 12.3 | 11.5 | 12.3 | 14.6 | 15.5 | 16.0 |
| Maximum transmittance between 610–620 mμ (%) | | | | 2.2 | 2.0 | 4.0 | 2.6 | 2.0 | 3.3 | 2.7 | 2.3 | 2.0 | 2.0 | 2.0 |

The glass according to the present invention can be obtained by mixing raw materials comprising the above described composition, fusing at 1,300 to 1,450° C. in a crucible or a tank made of ceramic or platinum, stirring, rafining, casting into a mold and gradually cooling. As the raw materials, it is possible to use raw materials for conventional glass with the exception of reducible raw materials, such as oxides, carbonates, nitrates and hydroxides, etc.

The glasses shown in Examples 5–22 have a transmission peak only at 540 to 550 mμ wherein the peak transmittance is 10 to 16%. In these glasses, the half-width of the transmission peak is 25 mμ and the peak is sharp.

Further, they hardly pass light outside the transmission peak wavelength. The glasses shown in Example Nos. 23-32 have a transmission peak in the wavelength range of 540 to 550 m$\mu$, through which 2 to 4% of light having wavelength range of 610 to 620 m$\mu$ passes. Using these glasses, sharp green or red images are obtained.

Since the glass according to the present invention has the above described transmission characteristics, the images formed are very clear when it is used as on the front panel of a CRT display on device, and consequently they are suitable for not only as displays for information or advertisements but also radar indication devices, etc.

While the invention has been described in detail and with reference to specific embodiments thereof, it will be apparent to one skilled in the art that various changes and modifications can be made therein without departing from the spirit and scope thereof.

What is claimed is:

1. A green filter glass having a sharp transmission peak in only the wavelength range of 540 to 550 m$\mu$ where the peak transmittance is to 10 to 16% through which 2 to 4% light having a wavelength of 610 to 620 m$\mu$ passes together with the light in the 540 to 550 m$\mu$ transmission peak consisting essentially of:

about 0.1 to 1.5 part by weight $Cr_2O_3$,
about 0 to 0.5 part by weight CuO,
about 0 to 0.2 part by weight NiO and
100 parts by weight of a base glass composition consisting essentially of:
about 4 to 70% by weight $SiO_2$
about 15 to 30% by weight $Nd_2O_3$
about 0 to 25% by weight of an alkali metal oxide ($R_2O$) and
about 0 to 46% by weight of a divalent metal oxide (RO) such that the sum of $R_2O$ and RO is about 10 to 50% by weight
about 0 to 25% by weight $B_2O_3$
about 0 to 10% $Al_2O_3$ and
about 0 to 10% by weight of each of $TiO_2$, $ZrO_2$, $La_2O_3$, $Nb_2O_5$ and $Ta_2O_5$.

2. The glass of claim 1, wherein $R_2O$ is $K_2O$, $Na_2O$ or $Li_2O$.

3. The glass of claim 1, wherein RO is MgO, CaO, SrO, BaO, ZnO and PbO.

4. The glass of claim 1, wherein RO is PbO or BaO.

5. The glass of claim 1, wherein RO is present.

6. The glass of claim 1, wherein the total amount of $TiO_2$, $ZrO_2$, $La_2O_3$, $Nb_2O_5$ and $Ta_2O_5$ is up to 20% by weight of the base glass composition.

* * * * *